(12) United States Patent
Patterson

(10) Patent No.: US 6,629,273 B1
(45) Date of Patent: Sep. 30, 2003

(54) DETECTION OF SILENT DATA CORRUPTION IN A STORAGE SYSTEM

(75) Inventor: Brian L. Patterson, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/490,793

(22) Filed: Jan. 24, 2000

(51) Int. Cl.⁷ .......................... G11C 29/00; H04B 1/74; H05K 10/00
(52) U.S. Cl. .......................................... 714/718; 714/54
(58) Field of Search ................................. 714/718, 721, 714/42, 6, 7, 11, 30, 52, 54, 48

(56) References Cited

U.S. PATENT DOCUMENTS

| | | | | |
|---|---|---|---|---|
| 4,775,978 A | | 10/1988 | Hartness ..................... 371/38 |
| 5,088,081 A | * | 2/1992 | Farr ........................ 369/47.14 |
| 5,210,860 A | * | 5/1993 | Pfeffer et al. ................ 714/42 |
| 5,500,940 A | | 3/1996 | Skeie ..................... 395/183.01 |
| 5,504,858 A | | 4/1996 | Ellis et al. ............. 395/182.04 |
| 5,546,535 A | * | 8/1996 | Stallmo et al. ................ 714/42 |
| 5,572,661 A | | 11/1996 | Jacobson ................ 395/182.05 |
| 5,581,690 A | | 12/1996 | Ellis et al. .............. 395/182.04 |
| 5,615,335 A | * | 3/1997 | Onffroy et al. ................ 714/25 |
| 5,615,352 A | | 3/1997 | Jacobson et al. ........... 395/441 |
| 5,632,012 A | * | 5/1997 | Belsan et al. ................... 714/6 |
| 5,655,150 A | * | 8/1997 | Matsumoto et al. .......... 710/15 |
| 5,664,187 A | | 9/1997 | Burkes et al. .............. 395/621 |
| 5,961,652 A | | 10/1999 | Thompson ..................... 714/6 |
| 6,223,301 B1 | * | 4/2001 | Santeler et al. ................ 714/6 |

* cited by examiner

Primary Examiner—Albert Decady
Assistant Examiner—Cynthia Britt
(74) Attorney, Agent, or Firm—Matthew L. Wade

(57) ABSTRACT

A storage system is described that includes a controller and a disk array. The controller operates to coordinate data transfers between the disk array and an external host computer in response to I/O commands received from the host computer. The controller further operates to execute a background program each time certain conditions are met. Under the direction of the background program, the controller operates to identify corrupt but readable data blocks based upon the value of the data block and the value of an error code stored for the data block.

20 Claims, 5 Drawing Sheets

| D1 | | | | | | | | | | | | | | | |
|---|---|---|---|---|---|---|---|---|---|---|---|---|---|---|---|
| 1-1 | CRC 1-1 | 1-2 | CRC 1-2 | 1-3 | CRC 1-3 | 1-4 | CRC 1-4 | 1-5-P | CRC 1-5 | 1-6 | CRC 1-6 | 1-7 | CRC 1-7 | 1-8 | CRC 1-8 |

| D2 | | | | | | | | | | | | | | | |
|---|---|---|---|---|---|---|---|---|---|---|---|---|---|---|---|
| 2-1 | CRC 2-1 | 2-2 | CRC 2-2 | 2-3 | CRC 2-3 | 2-4-P | CRC 2-4 | 2-5 | CRC 2-5 | 2-6 | CRC 2-6 | 2-7 | CRC 2-7 | 2-8 | CRC 2-8 |

| D3 | | | | | | | | | | | | | | | |
|---|---|---|---|---|---|---|---|---|---|---|---|---|---|---|---|
| 3-1 | CRC 3-1 | 3-2 | CRC 3-2 | 3-3-P | CRC 3-3 | 3-4 | CRC 3-4 | 3-5 | CRC 3-5 | 3-6 | CRC 3-6 | 3-7 | CRC 3-7 | 3-8-P | CRC 3-8 |

| D4 | | | | | | | | | | | | | | | |
|---|---|---|---|---|---|---|---|---|---|---|---|---|---|---|---|
| 4-1 | CRC 4-1 | 4-2-P | CRC 4-2 | 4-3 | CRC 4-3 | 4-4 | CRC 4-4 | 4-5 | CRC 4-5 | 4-6 | CRC 4-6 | 4-7-P | CRC 4-7 | 4-8 | CRC 4-8 |

| D5 | | | | | | | | | | | | | | | |
|---|---|---|---|---|---|---|---|---|---|---|---|---|---|---|---|
| 5-1-P | CRC 5-1 | 5-2 | CRC 5-2 | 5-3 | CRC 5-3 | 5-4 | CRC 5-4 | 5-5 | CRC 5-5 | 5-6-P | CRC 5-6 | 5-7 | CRC 5-7 | 5-8 | CRC 5-8 |

FIG. 2

DETECTION OF SILENT DATA CORRUPTION IN A STORAGE SYSTEM

BACKGROUND OF THE INVENTION

Computing systems often include a mass storage system for storing data. One popular type of mass storage system is a "RAID" (redundant arrays of inexpensive disks) storage system. A detailed discussion of RAID systems is found in a book entitled, *The RAID Book: A Source Book for RAID Technology*, published Jun. 9, 1993, by the RAID Advisory Board, Lino Lakes, Minn.

A typical RAID storage system includes a controller and a disk array coupled together via a communication link. The disk array includes multiple magnetic storage disks for storing data. In operation, the controller of a RAID storage system operates to receive Input/Output (I/O) commands from an external host computer. In response to these I/O commands, the controller reads and writes data to the disks in the disk array and coordinates the data transfer between the disk array and the host computer. Depending upon the RAID implementation level, the controller in a RAID system also generates and writes redundant data to the disk array. The redundant information enables regeneration of user data in the event that the data becomes corrupted.

A RAID level 1 storage system, for example, includes one or more disks (data disks) for storing data and an equal number of additional "mirror" disks for storing the redundant data. The redundant data in this case is simply a copy of the data stored in the data disks. If data stored in one or more of the data disks becomes corrupted, the mirror disks can then be used to reconstruct the corrupted data. Other RAID levels store redundant data for data distributed across multiple disks. If data on one disk becomes corrupted, the data in the other disks are used to reconstruct the corrupted data.

One common function of a controller in a RAID storage system is to periodically test each disk for data corruption. This is often accomplished by the controller performing a series of read operations upon each disk. If data is not received by the controller from a particular read operation, the corresponding data is determined to be corrupted. The controller may then notify the user or may automatically attempt to recover the data or both. If, however, data is received as a result of the read operation, the data is assumed to be valid.

One problem with this type of test is that it may not detect corrupt but readable data stored in the disk array. This type of data corruption may sometimes be referred to as "silent data corruption". That is, the data can be read but does not accurately represent the same pattern of bits that were originally stored. Importantly, this type of data corruption may remain undetected for an extended period of time This is especially true if the corruption occurs to a small segment of the stored data (such as a single data block) that is rarely accessed by the user.

The occurrence of silent data corruption can significantly increase the risk of data loss in a RAID storage system. For example, consider a RAID-5 system that has five disks, with the fifth disk being a parity disk. Let us assume that a single data block stored on the second disk is readable but is corrupted and that this corruption remains undetected. Now further assume that the fourth disk fails. The failure of the fourth disk is subsequently detected by the controller and the controller begins a data recovery operation to recover the data in the fourth disk. Unfortunately, because there is a corrupt data block in the second disk, some data on the fourth disk is not recoverable. In addition, the corrupted data block on the second disk is also not recoverable.

In view of the foregoing it can be seen that what is needed is an improved way to detect silent data corruption in a RAID storage system prior to additional data being lost in the storage system.

SUMMARY OF THE INVENTION

In one embodiment of the invention a controller for a disk array is provided. The disk array is for storing at least one data block and an error code for the data block. The controller operates to periodically select the data block to be tested for corruption. Upon the data block being selected to be tested, the controller further operates to determine if the block is corrupt based upon the value of the data block and the value of the error code for the data block.

In another embodiment, a storage system is provided. The storage system includes a disk array for storing at least one data block and an error code for the data block. In addition, the storage system includes a first and a second apparatus. The first apparatus is operable to periodically select the data block to be tested for corruption. The second apparatus is operable to respond to the data block being selected by determining if the data block is corrupt by using the value of the data block and the value of the error code.

In yet another embodiment, a computer product is provided for identifying corrupt data stored in a disk array for storing a plurality of data blocks and an error code for each of the data blocks. The computer product includes a computer usable medium having a computer readable program means for causing the computer to: (a) periodically select a data block from the plurality of data blocks to be tested for corruption; (b) perform a read operation upon the disk array to read the data block and the error code for the data block; and (c) if the data block and error code is readable, then determining if the data block is corrupt based upon the value of the data block and the value of the error code. In one implementation, the computer product is a controller for the disk array. The controller being operable to receive I/O commands from an external host computer and to transfer data between the disk array and the host computer in response to the I/O commands. In one preferred implementation, the program is a background program having a pre-determined level of priority.

In addition, the program may further cause the computer to attempt to recover the data block if the data block is determined to be corrupt.

Other aspects and advantages of the present invention will become apparent from the following description, taken in conjunction with the accompanying drawings, illustrating by way of example the principles of the present invention.

BRIEF DESCRIPTION OF THE DRAWINGS

FIG. 2 illustrates how the data is organized onto each storage disk in the data storage system depicted in FIG. 1;

DETAILED DESCRIPTION OF THE INVENTION

Figure 1:
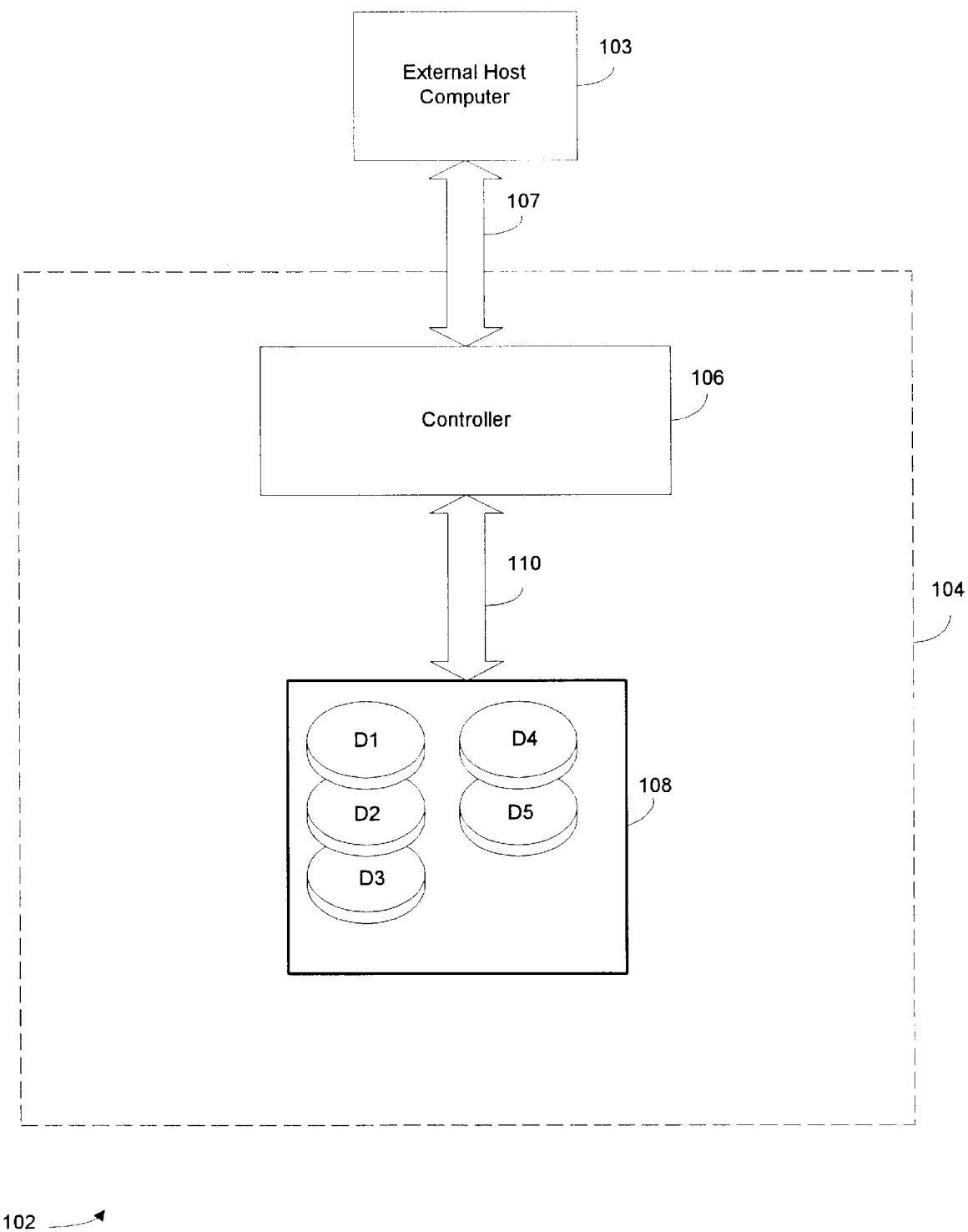
FIG. 1 shows a block diagram of a data storage system incorporating an embodiment of the invention.

As will be shown in the drawings for purposes of illustration, the invention is embodied in a RAID storage system including a controller and a disk array. As will be described in detail below, the controller operates to periodically execute a background test program. Under the direction of this program, the controller operates to detect corrupt, but readable, data in the disk array. That is, the controller operates to detect silent data corruption. Upon detecting the corrupt but readable data, the controller then operates to recover the data using standard techniques.

FIG. 1 shows a block diagram of a data processing system 102 which incorporates a first illustrative embodiment of the invention. The data processing system 102 includes a host computer 103 and a storage system 104 for providing the host computer 103 with mass storage.

The storage system 104 includes a controller 106 and a disk array 108. The controller 106 is connected to the host computer 103 via a first communication link 107 and to the disk array 108 via a second communication link 110. Both of these links may represent any suitable communication path. For example, the first communication link 108 may represent a local area network (LAN). The second communication link 110 may represent, for example, a small computer system interface (SCSI). The disk array 108 includes a collection of disks (D1–D5) for storing blocks of data. The disk array 108 also includes various other mechanisms (e.g., read/write heads and drive motors) and circuitry which are well known in the art.

In operation, the controller 106 can receive I/O commands from the host computer 103 via the communication link 108 in a standard manner. In response to these I/O commands the host computer can read and write data to the disks D1–D5 by sending appropriate control and data signals to the disk array 108 over the second communication link 110.

FIG. 2 illustrates how the data is organized (by operation of the controller 106) onto each disk. As indicated, the data is stored in blocks and in accordance with a RAID-5 storage scheme. The column headings D1–D5 represent the individual disks in the array. Each entry in a column represents a data block stored in the corresponding disk.

For simplicity, each disk is represented as having a storage capacity of only 8 blocks. It will be recognized, however, that a disk in a RAID storage system incorporating the invention will often include a greater number of data blocks. The blocks are designated as "X-X", where the first "X" represents the number of the disk and the second "X" represents the number of the data block. Thus, for example, the data block labeled "1-7" is the seventh block in the first disk, D1. A "stripe" of data refers to the user data blocks and parity data blocks located in the same row. Thus, for example, data blocks "1-1", "2-1", "3-1" and "4-1" are user data blocks (i.e., blocks consisting of user data) for the first stripe.

Those blocks designated as "X-X-P" represent the parity data block associated with a particular stripe. For example, 5-1-P is the parity data block for the first stripe. The parity data block for each stripe is computed by the controller 106 using some function, such as an exclusive OR function. In this RAID-5 storage system the parity data blocks are distributed across the disks in a repetitive pattern, although, in general, this is not necessary.

It is important to note that, as indicated in FIG. 2, upon writing a data block (i.e., a user data block or parity data block) to a disk, the controller 106 also writes an error code (in a standard manner) for the data block to the disk. The error code, in this example, is a cyclic redundancy check (CRC) value. For purposes of this document, however, the term "error code" refers to any set of data that can be used to determine if a data block is corrupt. Thus, for example, in other implementations the error code could be a checksum value or parity data.

Figure 3:
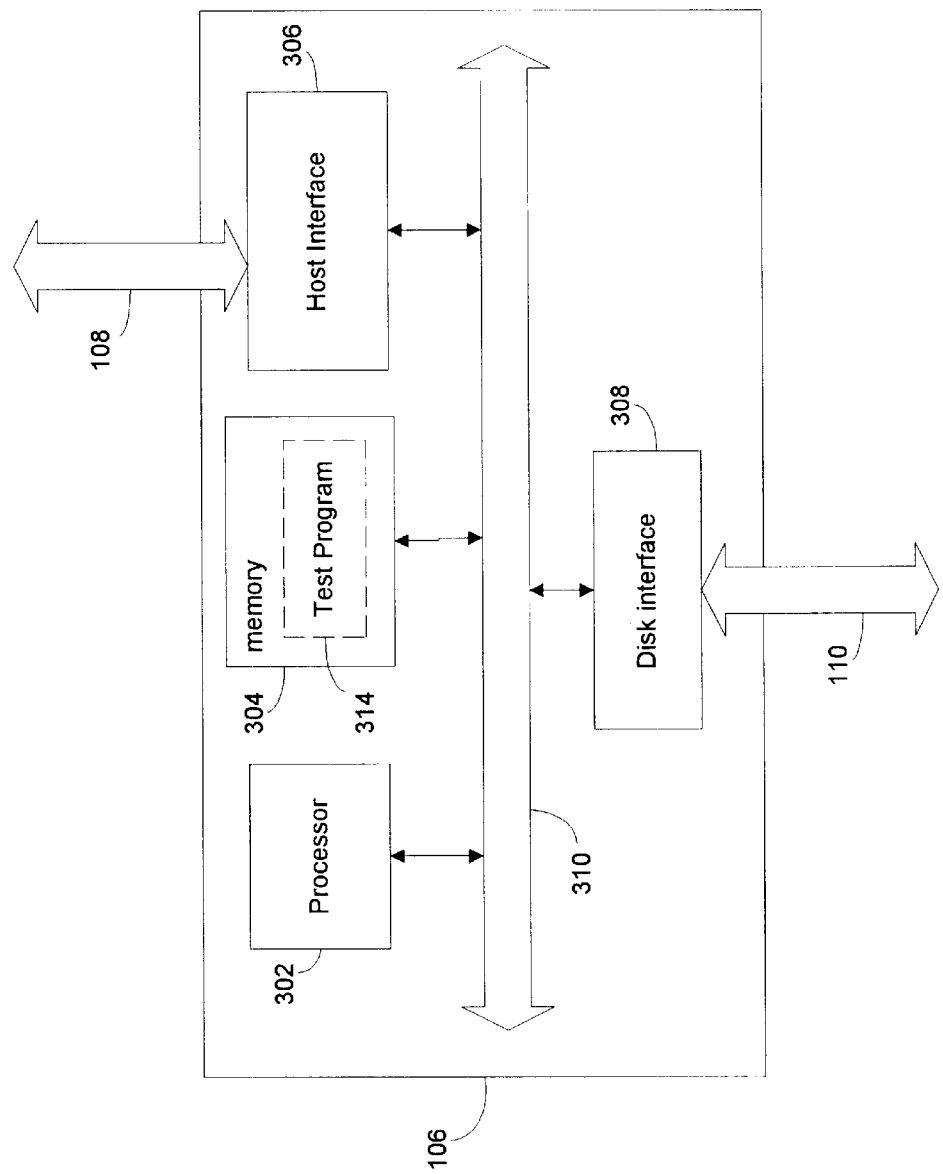
FIG. 3 is a high level schematic of the controller in the data storage system depicted in FIG. 1.

FIG. 3 is a high level schematic of the controller 106. As shown, the controller 106 includes a processor 302, a memory 304, a host interface 306 and a disk interface 308 all connected via a local bus 310. It is noted that each of these components may in fact include multiple devices. For example, the memory 304 may include one or more read only memories (ROM) and one or more random access memories (RAM). The local bus 310 may include, for example, one or more data buses with accompanying control buses. As shown, the host interface 306 provides the controller 106 with an interface to the host computer 103 (via the first communication link 108). The disk interface 308 provides an interface to the disk array 108 (via the second communication link 110).

The processor 302 operates to execute various firmware programs stored in the memory 304. Many of these programs may be standard and enable the controller 106 to receive and process I/O commands received over the host interface 306 and to coordinate the transfer of data between the host computer 103 and the disk array 108 in response to the I/O commands.

Importantly, one of the programs executed by the processor 302 is a test program 314. As will be shown, the test program 314 directs the controller 106 to periodically test the data in the disk array 108 (data block by data block) to determine if any of the stored data blocks are corrupt. Importantly, under the direction of this program, the controller 106 operates to identify readable but corrupt data blocks stored in the disk array 108.

Figure 4:
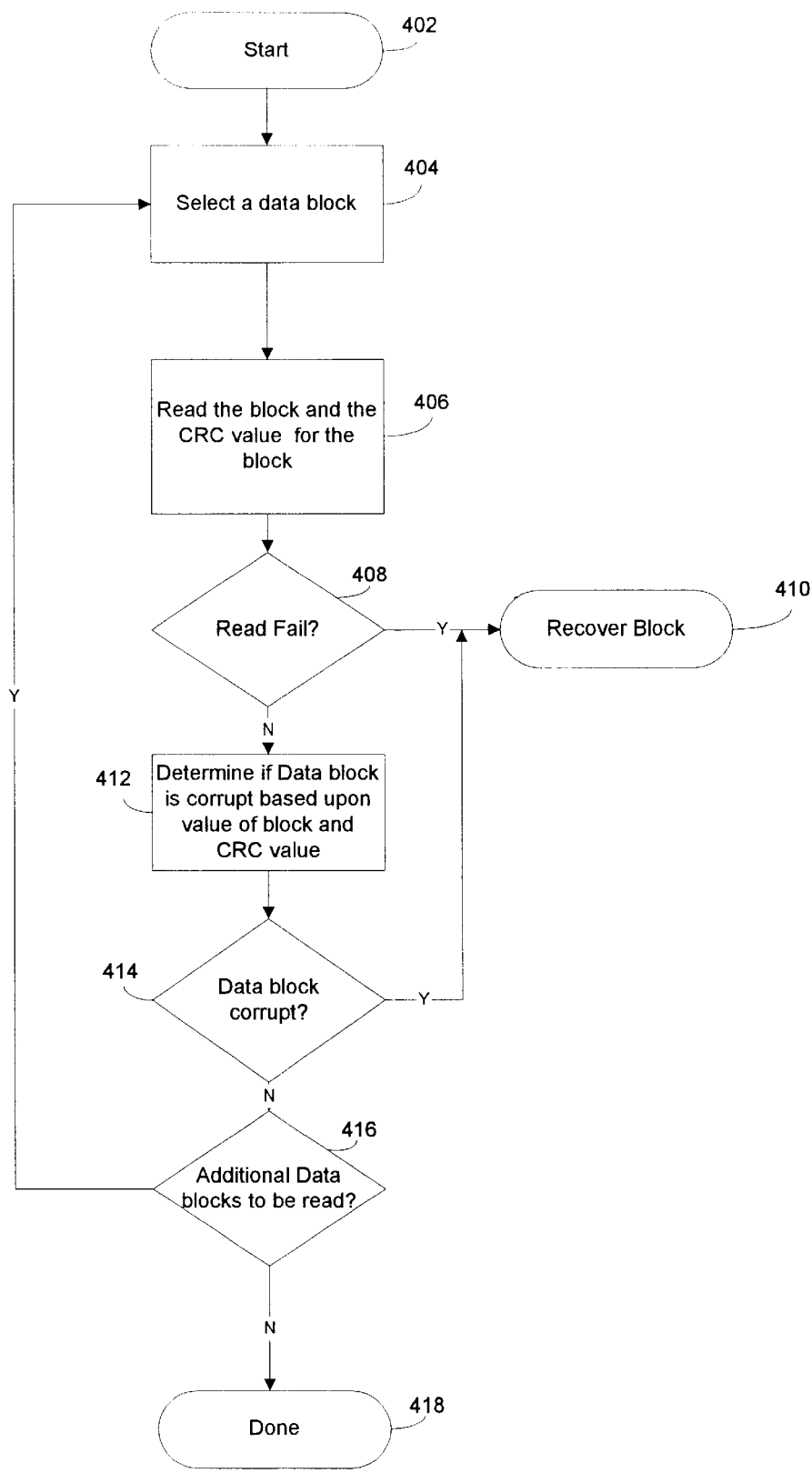
FIG. 4 is a flow diagram to illustrate generally the logic followed by the controller depicted in FIG. 3 while operating under the direction of a test program.

FIG. 4 is a flow diagram to illustrate generally the logic followed by the controller 106 while operating under the direction of the test program 314. Referring now to FIG. 4, upon the test program 314 being initiated (step 402), a data block is selected to be tested (step 404) for data corruption.

The controller 106 then performs a read operation on the appropriate disk in order to read the selected data block and the CRC value (i.e., the error code) for the data block (step 406). If data is not received from the disk array 108 after performing the read operation (decision step 408), the data block is determined to be corrupt. The data block can then be recovered using standard techniques (step 410). For example, the controller 106 may proceed to use the data blocks in the corresponding stripe to recover the data block.

If, however, the data block is received by the controller 106 after performing step 406 the controller 106 then further tests the (readable) data block for corruption (step 412). That is, the controller 106 tests the data block for silent data corruption. Importantly, this test is performed based upon the value of the data block and the CRC value stored for the data block which were both received in step 406. For ease of the following discussion, the CRC value received in step 406 is referred to as "CRC __READ".

Specifically, step 412 is accomplished by the controller 106 computing a new CRC value (CRC__NEW) based upon the value of the data block read in step 406. The CRC__READ is then compared to CRC__NEW to determine if the two error codes are identical. If the two values are not identical, the controller 106 determines that the data block is corrupt. If the controller 106 determines that the data block is corrupt (decision step 414), the data block can then be recovered using standard techniques (step 410) as described above.

If, however, the controller 106 determines that the data block is not corrupt (i.e., the two CRC values are determined to be identical), a determination is then made as to whether there are additional data blocks to be read (decision step 416) from the disk array 108. If there are, then steps 406–416 are repeated until each data block stored in the disk array 108 is tested for corruption. The program then ends (step 418).

It is important to note that in the preferred embodiment, the test program 314 is a background program having a pre-determined level of priority. That is, the program is automatically executed by the processor 302 each time certain pre-determined conditions are met. For example, in this embodiment the test program 314 is executed each time the following conditions are met. First, a pre-determined amount of time has passed since the last time the program was executed. Second, the controller is not presently executing a program having a higher level priority. In other embodiments, the test program is executed any time a higher level program is not presently executing.

It is also noted that the test program 314 is interruptible to allow the controller 106 to perform activities having higher priority. For example assume the controller 106 is presently executing the test program 314 and an I/O command is received from the host computer 103. Upon the I/O command being received, the test program 314 is interrupted to allow for the controller 106 to process the I/O command. After the I/O command is processed, the execution of the test program 314 then resumes.

From the foregoing it will be appreciated that a RAID storage system provided by the invention employs a novel and advantageous technique for detecting silent data corruption in a disk array. Once the corrupted data is detected, it can be recovered (by using standard techniques) prior to additional data being corrupted. This serves to reduce the likelihood of data loss in the storage system. Thus, overall data storage reliability is increased.

It is noted that in some situations, it may be advantageous to adapt the test program so that disks that have lower reliability are tested for corruption more frequently than disks that have higher reliability. This can result in further improving the overall reliability of the storage system.

Figure 5:
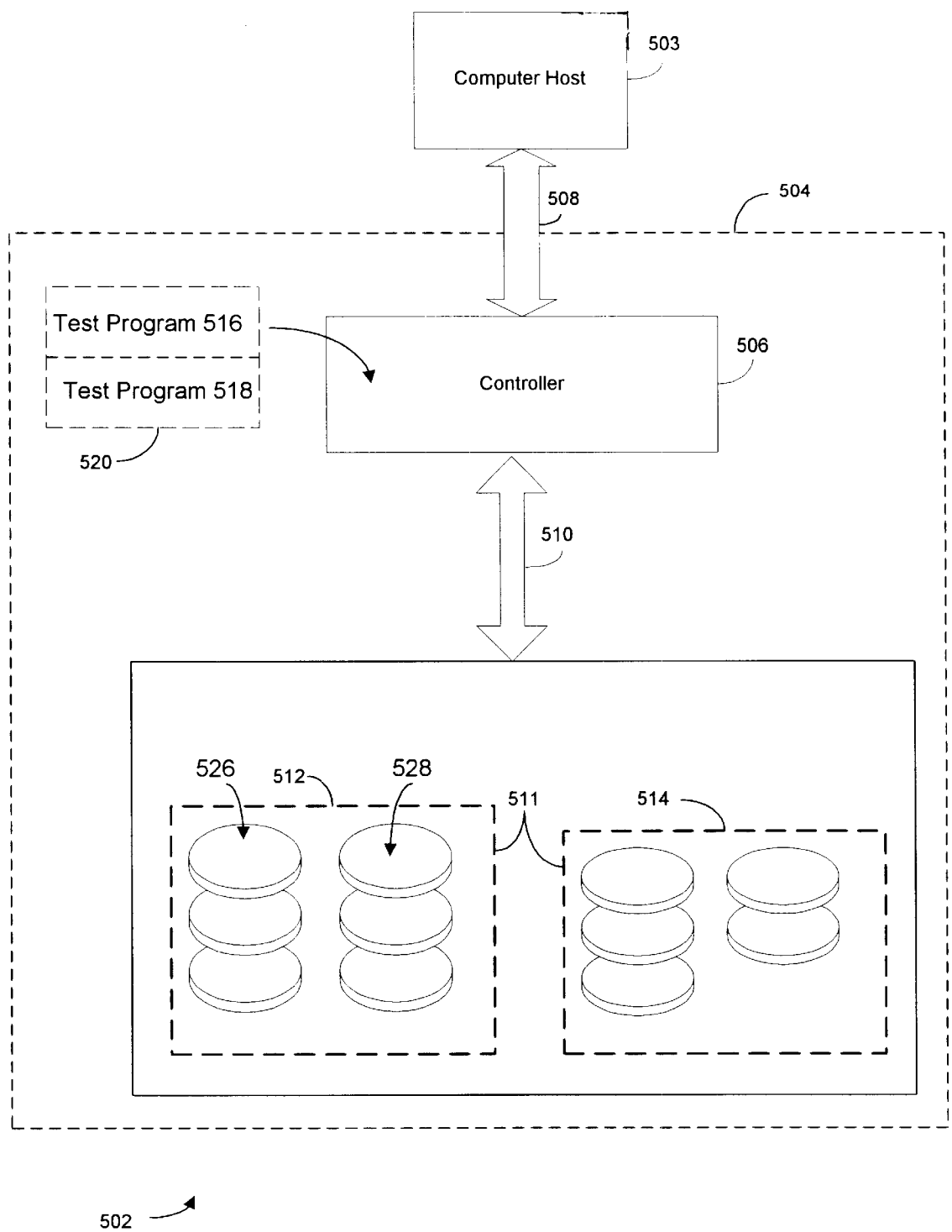
FIG. 5 shows a block diagram of a data processing system incorporating another embodiment of the invention.

To illustrate this further, FIG. 5 shows a block diagram of a second data processing system 502 which incorporates a second embodiment of the invention. Similar to the first embodiment, the data processing system 502 includes a host computer 503 and a storage system 504 connected as shown via a first communication link 508. The storage system 504 includes a controller 506 and a disk array 511 connected together via a second communication link 510.

The storage disks in disk array 511 can be conceptualized, for purposes of explanation, as being arranged in two groups, each group having a separate RAID level. A first group (RAID-1 disks) 512 represent a RAID level 1 memory location in the storage system 504. The mirror redundancy is diagrammatically represented by the three pairs of disks. Original data is stored by the controller 506 onto the first set of disks 526 while a copy of the data is stored in the second set of disks 528. A second group (RAID-5 disks) 514, represent a RAID level 5 memory location in the storage system 504.

In this embodiment, the controller 506 includes a first test program 516 and a second test program 518 which is stored in an internal memory 520. The first test program 516 directs the controller 506 to test the RAID-1 disks 512 for corruption. In addition, the second test program 518 directs the controller 506 to test the RAID-5 disks for corruption.

Both test programs operate to test each disk in the corresponding group in the same manner as described above. Thus, each data block that can not be read from a disk is determined to be corrupt. In addition, each data block that can be read from a disk is tested for corruption based upon the value of the data block and the value of the error code stored in the disk for the data block. Importantly, however, because the risk of data loss is considered to be higher for data stored in the RAID-5 disks 514 these disks are tested more frequently than the RAID-1 disks 512. Thus, the second test program 518 is scheduled to be executed more often than the first test program 516. This results in improving system reliability while balancing the available resources that can be dedicated to testing the disks in the storage system.

It is noted that in the embodiments described above, the functionality provided by the test program may in actuality be provided by more than one program stored in one or more memory devices. Alternatively, the functionality may also be provided, in whole or in part, by hardware components. For example, one or more of the steps illustrated in FIG. 4 could be performed (the following is a non-exhaustive list) by operation of an application specific integrated circuit (ASIC), a programmable gate array (PGA) or a field programmable gate array (FPGA) or by some combination thereof.

In addition, the present invention may also be embodied as a computer useable medium having computer readable program code embodied therein for causing a computer to perform one or more of the steps depicted in FIG. 4. In the context of this document, "computer useable medium" can be any means that contain, store, propagate or otherwise transport the program for use by or in connection with an instruction execution system, apparatus or device. The computer useable medium can be, for example (the following is a non-exhausting list), a magnetic, optical or a semiconductor based storage device (e.g., the memory 304 depicted in FIG. 3).

While various embodiments of the present invention have been described above, it should be understood that they have been presented by way of example only, and are not intended to be limiting. For example, the present invention can be used to improve many different types of RAID storage systems as well as other types of storage systems. For example, in the embodiment illustrated in FIG. 5, a first group of disks is dedicated to a RAID level 1 storage area. A second group of disks is dedicated to a RAID level 5 storage area. In other embodiments, however, each disk in the disk array is for storing data according to multiple RAID levels.

Thus, the breath and scope of the present invention should not be limited by any of the above described exemplary embodiments, but should be defined only in accordance with the following claims and their equivalents.

What is claimed is:

1. A controller for a disk array, the disk array for storing at least one data block and an error code for the data block, the controller comprising:

(a) means for periodically selecting the data block to be tested for corruption; and (b) means for responding to the data block being selected by determining if the data block is corrupt based upon the value of the data block and the value of the error code.

2. A controller according to claim 1, further comprising:
(c) means for initiating the operation of the selecting means.

3. A controller according to claim 1, further comprising:
(c) means for initiating the operation of the selecting means when pre-determined conditions are met, the conditions including a predetermined amount of time has passed since a last time the data block was tested.

4. A controller according to claim 3, further comprising:
(d) means for receiving I/O commands from an external host computer and reading and writing data to the disk array in response to the I/O commands.

5. A controller according to claim 3, further comprising:
(d) means for receiving I/O commands from an external host computer and reading and writing data to the plurality of storage disks units in response to the I/O commands; and
(e) means for interrupting the operation of the responding means in response to the receiving means receiving an I/O command from the external host computer.

6. A controller according to claim 3, wherein the disk array is further for storing redundant data to recover the data block; and wherein the controller further comprises:
(d) means for responding to the data block being determined to be corrupt by using the redundant data to recover the data block.

7. A controller according to claim 1, wherein the selecting means is a background program having a pre-determined level of priority.

8. A controller according to claim 1, wherein the selecting means is a background program having a pre-determined level of priority and is executed based upon a pre-determined schedule.

9. A storage system comprising:
(a) a disk array for storing at least one data block and an error code for the data block; and
(b) a first apparatus operable to periodically select the data block to be tested for corruption; and
(c) a second apparatus operable to respond to the data block being selected by determining if the data block is corrupt based upon the value of data block and the value of the error code.

10. A storage system according to claim 9, further comprising:
(d) a controller operable to receive I/O commands from an external host and to coordinate data transfers between the external host and the disk array in response to the I/O commands; and wherein the first and second apparatus are incorporated within the controller.

11. A storage system according to claim 10, wherein the operation of the first apparatus is initiated by the controller.

12. A storage system according to claim 10, wherein the operation of the first apparatus is initiated by the controller when pre-determined conditions are met, the conditions including a pre-determined amount of time has passed since the last time the data block was tested for corruption.

13. A storage system according to claim 12, wherein the disk array is further for storing redundant data for recovering the data block and the controller is further operable, in response to the data block being determined corrupt, to recover the data block using the redundant data.

14. A storage system according to claim 13, wherein the storage system is a RAID storage system.

15. A computer product for identifying corrupt data stored in a disk array, the disk array for storing a plurality of data blocks and an error code for each of the data blocks, the computer product comprising:
a computer usable medium having a computer readable program means for causing the computer to:
(a) periodically select a data block from the plurality of data blocks to be tested for corruption;
(b) perform a read operation upon the disk array to read the data block and the error code for the data block; and
(c) if the data block and the error code is readable, then determining if the data block is corrupt based upon the value of the data block and the value of the error code.

16. The computer product of claim 15, wherein the computer product is a controller for the disk array operable to receive I/O commands from an external host computer and to transfer data between the disk array and the host computer in response to the I/O commands.

17. The computer product of claim 16, wherein the program is a background program having a pre-determined level of priority.

18. The computer program product of claim 17, wherein the computer readable program further causes the computer to:
(d) attempt to recover the data block if the data block is determined to be corrupt.

19. The computer product of claim 18, wherein the controller operates to execute the program each time pre-determined conditions are met.

20. The computer product of claim 19, wherein the conditions include a pre-determined amount of time has passed since the last time the program was executed.

* * * * *